United States Patent [19]
Jensen et al.

[11] Patent Number: 5,930,828
[45] Date of Patent: Jul. 27, 1999

[54] REAL-TIME APPARATUS AND METHOD FOR MINIMIZING DISK FRAGMENTATION IN A COMPUTER SYSTEM

[75] Inventors: Craig Charles Jensen, LaCanada Flintridge; Andrew C. Staffer, Westlake Village, both of Calif.

[73] Assignee: Executive Software International, Glendale, Calif.

[21] Appl. No.: 08/824,036

[22] Filed: Mar. 26, 1997

[51] Int. Cl.$^6$ ..................................................... G06F 12/00
[52] U.S. Cl. ......................... 711/170; 707/205; 707/103; 707/206; 707/1; 711/170; 360/48
[58] Field of Search ............................ 711/170; 707/205, 707/103, 206, 1; 360/48

[56] References Cited

U.S. PATENT DOCUMENTS

| | | | |
|---|---|---|---|
| 5,088,036 | 2/1992 | Ellis et al. | 707/206 |
| 5,398,142 | 5/1995 | Davy | 360/48 |
| 5,574,907 | 11/1996 | Jernigan, IV et al. | 707/1 |
| 5,604,902 | 2/1997 | Burkes et al. | 707/206 |
| 5,687,368 | 11/1997 | Nilsen | 707/103 |
| 5,778,392 | 7/1998 | Stockman et al. | 707/205 |

*Primary Examiner*—Tod R. Swann
*Assistant Examiner*—Nasser Moazzami
*Attorney, Agent, or Firm*—Wagner Murabito & Hao

[57] ABSTRACT

The present invention relates to an apparatus and method for defragmenting a disk drive in a computer system. The defragmentation process, in accordance with the present invention, determines which files have a high degree of fragmentation, where such file extents are to be physically moved on the disk and further determines which portions of such files are to be moved to the selected physical location. More particularly, the defragmentation process selects each file on the disk, checks to see if the file is excluded from processing and, if not, recovers the extent list for the file. If the file is fragmented, the process determines if there is sufficient free space in which to move the file extents to contiguous location on the disk. If such as space exists, the file extents are moved. If the free space is sufficiently fragmented or the disk is substantially full, contiguous files are moved to contiguous locations so as to partially defragment the file. If the file is already contiguous or if there is insufficient free space available to partially defragment the fragmented files, the process of the present invention moves the files or the file extents so as to maximize contiguous free space on the disk. The process then repeats so as to further defragment files that were previously left fragmented. In this manner fragmented files and fragmented free space on the disk are made contiguous. Files are then moved toward the front of the disk where possible. When the fragmentation process is complete, contiguous files tend to be packed toward the front of the disk with defragmented free space tending to be located toward the end of the disk.

15 Claims, 13 Drawing Sheets

REAL-TIME APPARATUS AND METHOD FOR MINIMIZING DISK FRAGMENTATION IN A COMPUTER SYSTEM

BACKGROUND OF THE INVENTION

The present invention relates to defragmentation of a storage device in a computer system and more particularly, to an apparatus and method for minimizing disk fragmentation in real-time.

It is well known that when files are stored to a disk, fragmentation will eventually occur as existing files are modified, new files are added or old files deleted. Fragmentation is a condition where stored files and disk free space both become non-contiguous in nature. Specifically, as defined on page 29 of the book: Fragmentation, the Condition, the Cause, the Cure, by Craig Jensen published by Executive Software, Inc. of Glendale, Calif., the assignee of the present application, file fragmentation is a condition in which individual files are stored on the disk in more than one non-contiguous fragment or extent while free space fragmentation is a condition in which the free space (i.e. unallocated storage locations) on the disk is scattered and substantially non-contiguous.

As will be appreciated, file fragmentation tends to increase as the number of files stored on the disk increases and as files are modified, added, or deleted. Indeed, it is common for a single file to become fragmented into a plurality of pieces often exceeding hundreds or even thousands of fragments scattered about the disk. As files are deleted, free space fragmentation also tends to increase. Eventually, with smaller and smaller amounts of contiguous free space available, even relatively small new files stored on the disk must be fragmented to conform to the available free space. Due to the time required to position the disk drive's read/write head over each fragment and then wait for the rotation of the disk to position the appropriate sector under the head, system performance is significantly impacted each time a fragmented file is transferred to or from the disk.

As with many other operating systems, fragmentation has been determined to be also prevalent in computer systems running under the Windows NT (Windows NT is a trademark of Microsoft Corporation) operating system because most files are not contiguously written to disk. For example, large files have been observed to be stored on the disk drive in as many as twenty thousands fragments. When reading such files, each fragment requires a separate disk access by the computer system resulting in unnecessary disk access operations which significantly decrease system performance and efficiency. In some instances fragmentation may become so severe that the transfer of files to or from disk becomes so slow as to render the disk unusable.

File fragmentation is further increased by the Windows NT disk compression algorithm that operates on portions of each file or file fragment. The compression algorithm individually compresses each portion and often stores the portions in non-contiguous locations. Accordingly, even if files and free space were contiguous, fragmentation, after the compression, will increase.

It should be apparent that files and free space on a disk drive can be rapidly fragmented to such a degree that efficiency and performance of the computer is degraded. Commercially viable software for defragmenting disk drives is available and has been marketed, by way of example, under the name of DISKEEPER by Executive Software, Inc, the present assignee (DISKEEPER is a trademark of Executive Software) for use with the OpenVMS (OpenVMS is a trademark of Digital Equipment Corporation) or Windows NT (version 3, 3.5, and 3.5.1) operating systems. As will be appreciated, commercially available disk drive defragmenting software programs are also available from other commercial vendors. Unfortunately, such software programs are resource intensive because a high percentage of the stored files on the disk drive must be moved in order to defragment the disk. As disk capacity approaches terabytes of stored files, system response time and disk availability will not be optimized due to the inefficiencies of such programs further, such software programs are poorly adapted to efficiently function in conjunction with operating systems such as Windows NT where it is necessary to synchronize movement of files on the disk with data stored in system cache. Further still, such software programs do not optimally defragment a plurality of disk drives connected to a network while the disk drives are active.

Whatever the merits of the above described methods for defragmenting disk storage systems, they do not achieve the benefits of the present invention especially when the computer system is operated under the Windows NT operating system. Accordingly, it is evident that an apparatus and method to efficiently defragment disk drives in a computer system is necessary. It is further evident that an apparatus and method to minimize fragmentation of files and free space in real-time so as to increase utilization or efficiencies of the computer system is necessary.

SUMMARY OF THE INVENTION

The apparatus and method of the present invention is designed to minimize fragmentation of files and free space on a disk drive storage device. The present invention locates the extents or fragments of each file stored on the disk and moves each fragment to a location on the disk such that the file extents are substantially contiguous and packed toward the beginning of the disk. As a result of the defragmentation process, few files are stored near the end of the disk providing contiguous free space.

The defragmentation process comprises a sequence of procedures designed to optimize file arrangement and maximize free space on the disk in real-time in a multitasking computer environment. In particular, the method of the present invention defragments the Window NT file system (NTFS) and file allocation table (FAT) file systems on disk drives to restore performance and to increase computer system efficiency.

The defragmentation process selects each file on the disk, checks to see if the file is excluded from processing and, if not, recovers the extent list for the file. If the file is fragmented, the process determines if there is sufficient free space in which to move the file extents to a contiguous location on the disk. If such a space exists, the file extents are moved. If the free space is sufficiently fragmented or the disk is substantially full, a portion of the file extents are moved to contiguous locations so as to partially defragment the file. If the file is already contiguous or if there is insufficient free space available to partially defragment the fragmented files, the process of the present invention moves the files or the file extents so as to consolidate free space on the disk. The process then repeats so as to further defragment files that were previously left fragmented.

In this iterative manner, at least a portion of some fragmented files are moved so as to create areas of contiguous free space on the disk. Subsequent iterations then move larger fragmented files to contiguous locations on subsequent iterations. In the preferred embodiment, after six iterations, substantially all files are contiguous and packed toward the beginning of the disk leaving contiguous free space toward the end of the disk.

The present invention minimizes file and free space fragmentation in real-time so as to minimize the number of separate disk accesses required to transfer files to or from the disk. Accordingly, by eliminating the hundreds or thousands of additional and unnecessary disk access operations typically incurred to transfer fragmented files, system performance and efficiency are substantially improved.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and that changes may be made without departing from the scope of the present invention. For purposes of illustration the following description describes the present invention as used with the Windows NT operating system with the disk or disks partitioned with NTFS and/or FAT files systems. However, it is contemplated that the present invention can be used in conjunction with other operating systems or disk drive file system partitions.

Some portions of the detailed description which follow are presented in terms of procedures, logic blocks, processing or other symbolic representations of operations on data bits within a computer system. These descriptions and representations are the means used by those skilled in the art to most effectively convey the substance of their work to others skilled in the art. In the present application, a procedure, logic block process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared and otherwise manipulated in a computer system. It has proved convenient at times, principally for reasons of common usage, to refer to these signals as bits, bytes, values, files or the like.

It should be borne in mind that all of these and similar terms are to be associated with the appropriate physical quantities and are merely convenient labels applied to these quantities. Unless otherwise specifically stated, it is appreciated that throughout the present invention, discussions utilizing terms such as "locating", "selecting", "determining", or "moving" or the like, refer to the actions and processes of a computer system, or similar electronic computing device. It is further appreciated that throughout the present invention, discussions utilizing the term "volume" may be used to denote a disk drive or similar storage device when it is more practical to refer to the disk as a logical or conceptual unit of storage rather than a physical unit of storage. Finally, it is to be understood that the computer system or similar electronic computing device manipulates and transforms data represented as physical (electronic and/or magnetic) quantities within the computer system's registers and memories into other data similarly represented as physical quantities within the computer system memories or registers or other such information storage, transmission or display devices.

Figure 1:
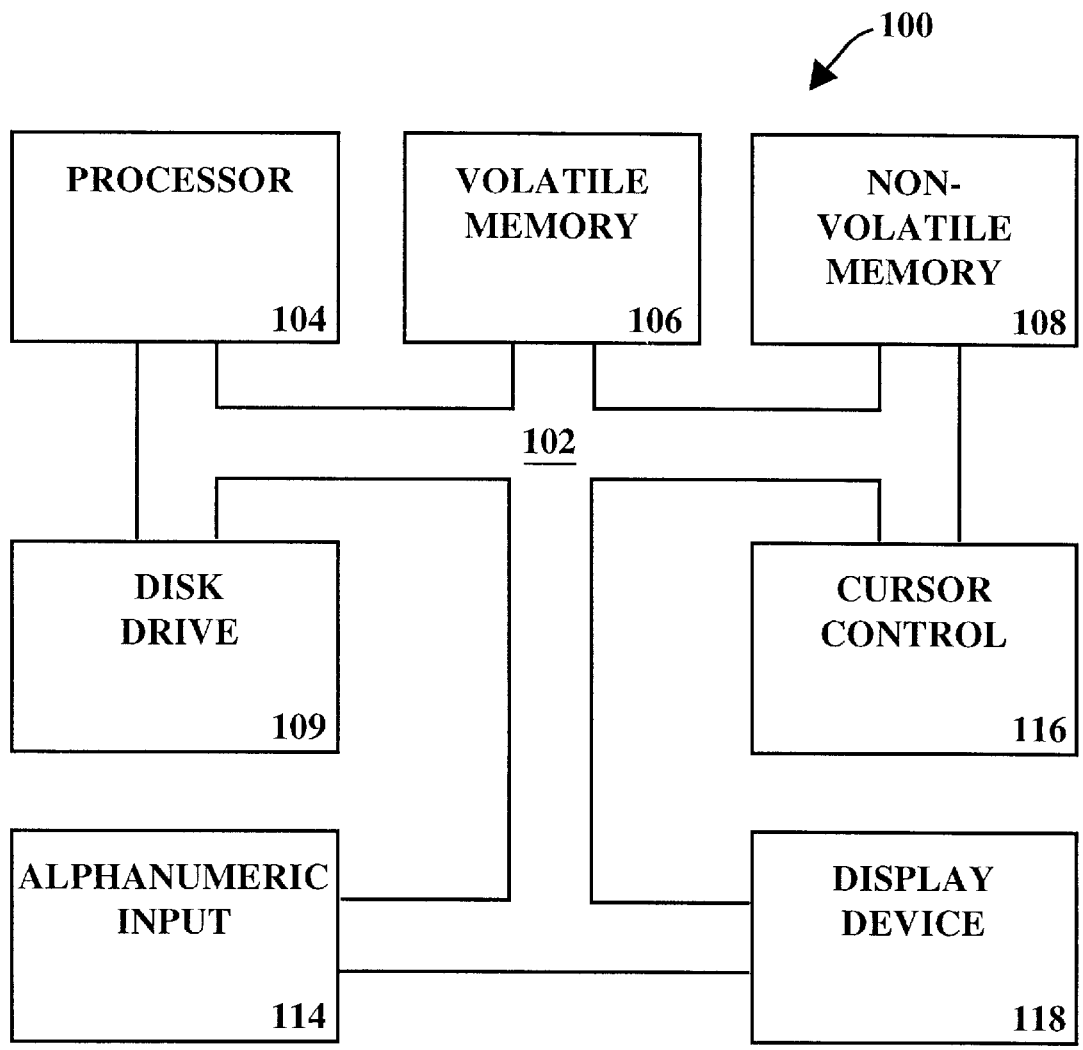
FIG. 1 is an illustration of an exemplary computer system.

With reference now to FIG. 1, an exemplary computer system 100, in which the present invention may be utilized, is illustrated. Computer system 100 comprises computer-readable and computer executable instructions which reside, for example, in computer-usable media. It is appreciated that system 100 of FIG. 1 is exemplary only and that the present invention can operate within a number of different computer systems including general purpose computer systems, embedded computer systems, and preferably stand-alone computer systems specially adapted for operation under the Microsoft Corporation "Windows NT" operating system (Windows NT is a trademark of Microsoft Corporation).

System 100 of FIG. 1 includes an address/data bus 102 for communicating information, and a central processor 104 coupled to bus 102 for processing information and instructions. Central processor 104 may include cache memory (not shown) to facilitate transfer of data to internal registers of central processor 104 in a manner known in the art. System 100 also includes data storage features such as a computer usable volatile memory 106, e.g. random access memory (RAM), coupled to bus 102 for storing information and instructions for central processor (CPU) 104, computer usable non-volatile memory 108, e.g. read only memory (ROM), coupled to bus 102 for storing static information and instructions for CPU 104, and at least one disk drive 109 (e.g. a magnetic or optical disk and disk drive) coupled to bus 102 for storing information and instructions. System 100 includes an alphanumeric input device 114 and a cursor control device 116, both coupled to bus 102, for communicating user input information and command selections to CPU 104. System further includes a display device 118 coupled to bus 102 for displaying information. As will be appreciated by persons of ordinary skill in the art, the exemplary computer system and the functions performed thereby are not critical to the use of the present invention and that other arrangements of devices, functions or network configurations may be substituted therefor.

Figure 2A:
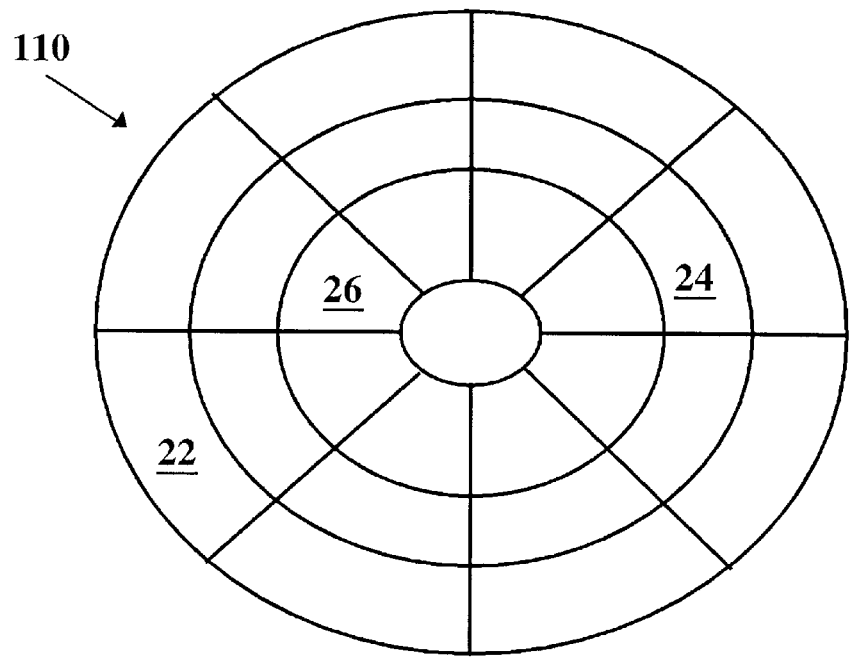
FIGS. 2A and 2B are illustrative representations of an exemplary disk drive and file arrangement on the disk drive.

Referring now to FIG. 2A, as is well understood in the art, the operating system, application programs and data files, collectively referred to as "files," are stored on disk 110 of FIG. 2A which is located within disk drive 109 of FIG. 1. These files are transferred in accordance with instructions of CPU 104. On disk 110, files are in one or more clusters where a cluster is the minimum allocation quantity that the disk may read or write. If the stored file comprises more than a single cluster, the file will be prone to fragmentation.

Just as the clusters of a file may be stored in non-contiguous locations on disk 110, the free space (i.e., the unallocated clusters) on disk 110 may become broken into non-contiguous clusters of free space. Once the free space becomes subdivided into smaller and smaller blocks of clusters, the latency period between a request from CPU 104 to access or store one of the files and the conclusion of file transfer will increase since files tend to be fragmented to conform to the available free space. This increase in latency degrades operating efficiency of computer system 100.

Windows NT is a 32-bit operating system that supports a wide variety of hardware platforms. The operating system provides software hooks (often referred to "application program interfaces" or "APIs") to interface application program functions or procedures to operating system features. As is well understood in the art, Windows NT supports both FAT and NTFS file systems. FAT is a limited-function legacy file system for low capacity disk drives that allocates free space on disk 110 and maintains directory functions for files stored on disk 110. Windows NT includes the FAT file system features primarily to ensure backward compatibility. NTFS (i.e., Windows NT File System) is an improved, recoverable file system adapted to handle file storage for high capacity disks (i.e. in excess of four gigabytes of storage capacity). Although only single disk 110 is shown in FIG. 2A, it is to be understood that disk 110 may include several volumes each having a different file system. It is to be further understood that the file structure of disk 110 may be changed by reformatting the disk so in the context of the discussion below, disk 110 is considered to have the appropriate file structure. Alternatively, it is to be understood that computer system 100 of FIG. 1 may include a plurality of disk drives 109.

FIG. 2A illustrates an exemplary disk 110. Specifically, the beginning of a disk is designated 22, the middle is designated 24 and the end of the disk is designated 26. Although the disk is shown in FIG. 2A having twenty-four sectors for illustrative purposes, it is to be understood that a high capacity disk comprises several thousand sectors.

Figure 2B:
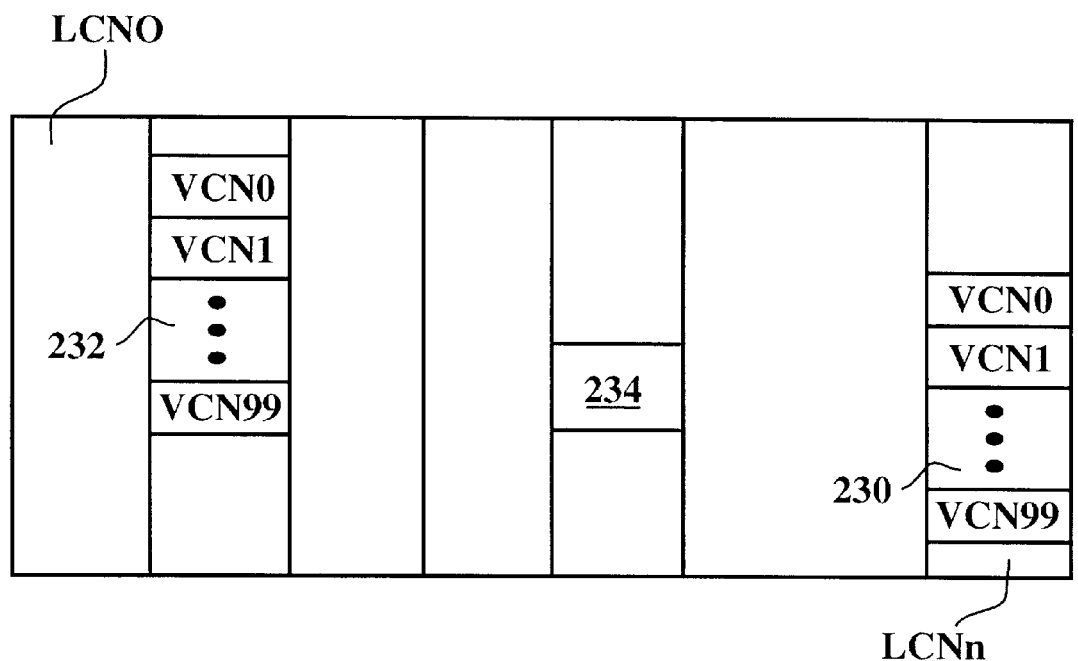

In FIG. 2B, disk 110 is represented as a plurality of data storage locations split into clusters with a first cluster defined as logical cluster number 0 (LCN0) being located at the beginning 22 of disk 110 and a last cluster (LCNn) located at the end of disk 110. Virtual cluster numbers (VCN) are also defined where VCN0 defines the initial cluster of a file regardless of where located on the disk and VCNn is the last cluster of the file. For example, in FIG. 2B, a contiguous file is shown at location 230 having its start or beginning location at VCN0 and ending at VCN99 (i.e., a file having 100 clusters). To move the file shown at location 230, the initial VCN0 is moved to LCN280 and the remaining clusters are moved to sequential LCN's (i.e., LCN379) resulting in the file being located closer to the beginning 22 of disk 110 as shown at 232.

Under the Windows NT NTFS file structure, a Master File Table (MFT), comprising a plurality of records, is stored on disk 110 in a MFT zone 234. Each record contains information regarding one of the files stored on disk 110. Specifically, each record contains the name of the file, its parent directory, security attributes, date and time stamps and an extent list, etc. The extent list defines the number of fragments that make up the file as well as the location of each fragment. For FAT partitioned disks, the operating system uses a file allocation table (FAT) to keep track of which cluster of information belongs in which file. The FAT is essentially a map that the operating system checks to find all of the clusters comprising the file no matter how the clusters are scattered on disk 110.

Figure 3:
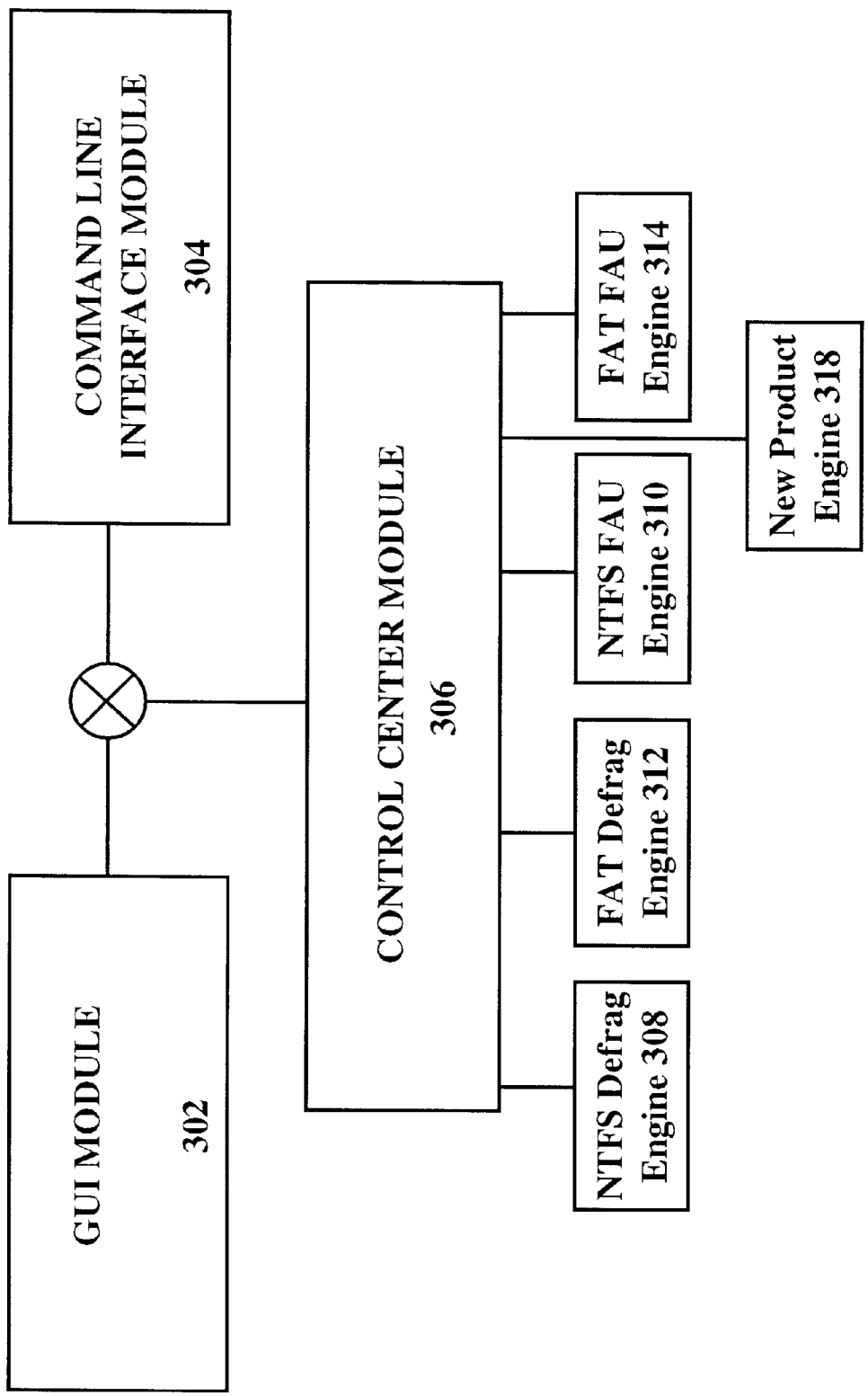
FIG. 3 is a functional block diagram illustrating the major components of the present invention.

Referring now to FIG. 3, a high level architectural representation of a preferred embodiment for implementing the present invention is shown comprising a graphical user interface (GUI) module 302, a command line interface module 304 and a control center module 306. The preferred embodiment further comprises a plurality of engines and specifically, a NTFS defrag engine 308, a NTFS fragmentation analysis unit (FAU) 310, a FAT defrag engine 312, and a FAT FAU 314. Additional engines such as new products engine 318 may be coupled to control center module 306 to provide additional features.

The GUI module 302 presents on display device 118 of FIG. 1 a graphical representation of relevant system parameters, such as, by way of example, the degree of file and free space fragmentation on disk 110 of FIG. 2. User commands may be entered by way of the keyboard or the mouse sensitive to the context of the displayed graphical representation. An alternative user interface is provided through a command line interface module 304 so that commands may be entered and system status reported on a text basis on display device 118.

In one preferred embodiment, GUI module 302 is a standard Windows NT, version 4.0, application that is launched by clicking on a icon presented on display device 118. Upon launch, the GUI module 302 spins off a thread and creates a named pipe (for example, PipeName=\\\\.\\pipe\\DiskeeperGuiPipe) which is used for incoming communication from the control center module 306. The thread waits indefinitely for the control center module 306 to connect to the named pipe by returning a valid pipe handle. The GUI module 302 then attempts to connect the named pipe of the control center module 306 (i.e., PipeName="\\\\NodeName\\pipe\\DiskeeperControlPipe"). If the connection is unsuccessful, GUI module 302 assumes the control center module 306 is not active and issues the necessary commands to initiate operation of control center module 306 and repeats the connection process just described.

When the control center module 306 is launched, a timer is started. In the present embodiment, the timer has a ten minute time-out value. Whenever a time-out occurs, a message is generated and passed to the control center module's message pump and the control center module 306 checks to see if any engine 308–318 has been scheduled to run. If scheduled, control center module 306 launches the engine or engines. The timer is then set for another ten minutes.

Upon launch, control center module 306 spins off a thread creating a named pipe (for example, PipeName="\\\\.\†pipe\\DiskeeperControlPipe") which is used for incoming communication from GUI module 302 for local connections or for connections over a network. The thread waits indefinitely for GUI module 302 to connect to this pipe. The control center module 306 then attempts to connect to the named pipe of the GUI module 302 (i.e., PipeName="\\\\NodeName\\pipe\\DiskeeperGuiPipe").

When GUI module 302 shuts down, the named pipe is broken and the control center's named pipe thread is terminated. Control Center module 306 then immediately spins off a new thread, creates a new named pipe and waits for another GUI connection.

If the control center module 306 is shutdown, the named pipe is broken and the thread that was spun off by GUI module 302 is terminated. GUI module 302 spins off a new thread and ccontrol center module e before waiting for another control center module 306 connection.

Associated with the control center module 306 is a control file that contains a disk record for each disk drive in computer system 100 of FIG. 1. Specifically, the control file contains the drive designation (e.g., A–Z); volume label; drive type; file system type; defrag type; engine state; and the scheduled times to perform the defragmentation process. At the end of the disk record the control file contains all exclusion list data for computer system 100 in a standard zero terminated text format for each exclusion item.

The control file is accessed and can be modified through GUI module 302. If a user makes a change in the control file, GUI module 302 notifies control center module 306. In response, control center module 306 parses the exclusion list section of the control file for each drive resulting in a separate exclusion file for each drive. Each parsed exclusion file is located in the same directory as the control file and is named in a drive-identifying manner. Once the control center module 306 has completed parsing, it notifies each engine 308–318 that a new exclude file has been created.

Control center module 306 launches engines 308–318 using the Windows NT application program interface. For example, upon launch, NTFS defrag engine 308 would register with the operating system under a name that is sufficient to allow the control center module 306 to differentiate between simultaneously active engines 308 grooming different disk drives. Control center module 306 communicates with engines 308–318 by message posting using the message pump and shared memory provided by the Windows NT operating system in a manner that is known in the art.

Engines 308–318 are responsible for specific functions. For example, NTFS FAU and FAT FAU engines 310 and 314, respectively, scans a disk, determines the degree of fragmentation on the disk and dumps the data to memory 106 (see FIG. 1). Ownership of the data depicting disk fragmentation characteristics is passed to control center module 306 and subsequently transferred to the defrag engines. Control center module 306 passes the data to each NTFS defrag engine 308 and FAT defrag engine 312. The data is used by the engines to defragment NTFS and FAT partitioned drives, respectively in a manner described below. Control center module 306 may also pass the data to GUI 302 to provide graphical representation to the system users or administrator.

The control center module 306 accesses appropriate APIs as a call to perform system level functions such as disk access as indicated at 320 in FIG. 3. To minimize system disruption, the control center module 306 monitors system activity and will only initiate calls at the lowest level of priority. Further, control center module 306 may suspend operation if CPU 104 of FIG. 1 is busy or if utilization of computer system 100 of FIG. 1 is high.

In the preferred embodiment, control center module 306 runs as a service under Windows NT and is launched automatically upon booting the operating system. Control center 306 controls all activity of the various engines 308–318 and, through GUI module 302, acts as the relay point of information between the user and the engines. Alternatively, the control center module 306 and the engines may be an embedded microprocessor associated with the disk 110 of FIG. 2A operating under firmware control.

Also in the present embodiment of the present invention, three tasks or disk scans are performed in an iterative manner. If disk 110 of FIG. 2 has an NTFS file system, the three tasks comprise processes that 1) identify and minimize fragmented files, 2) pack the files to maximize free space and 3) move files stored in areas of the disk reserved by the operating system as more fully described below.

1. NTFS PROCESS FLOW #1

Figure 4:
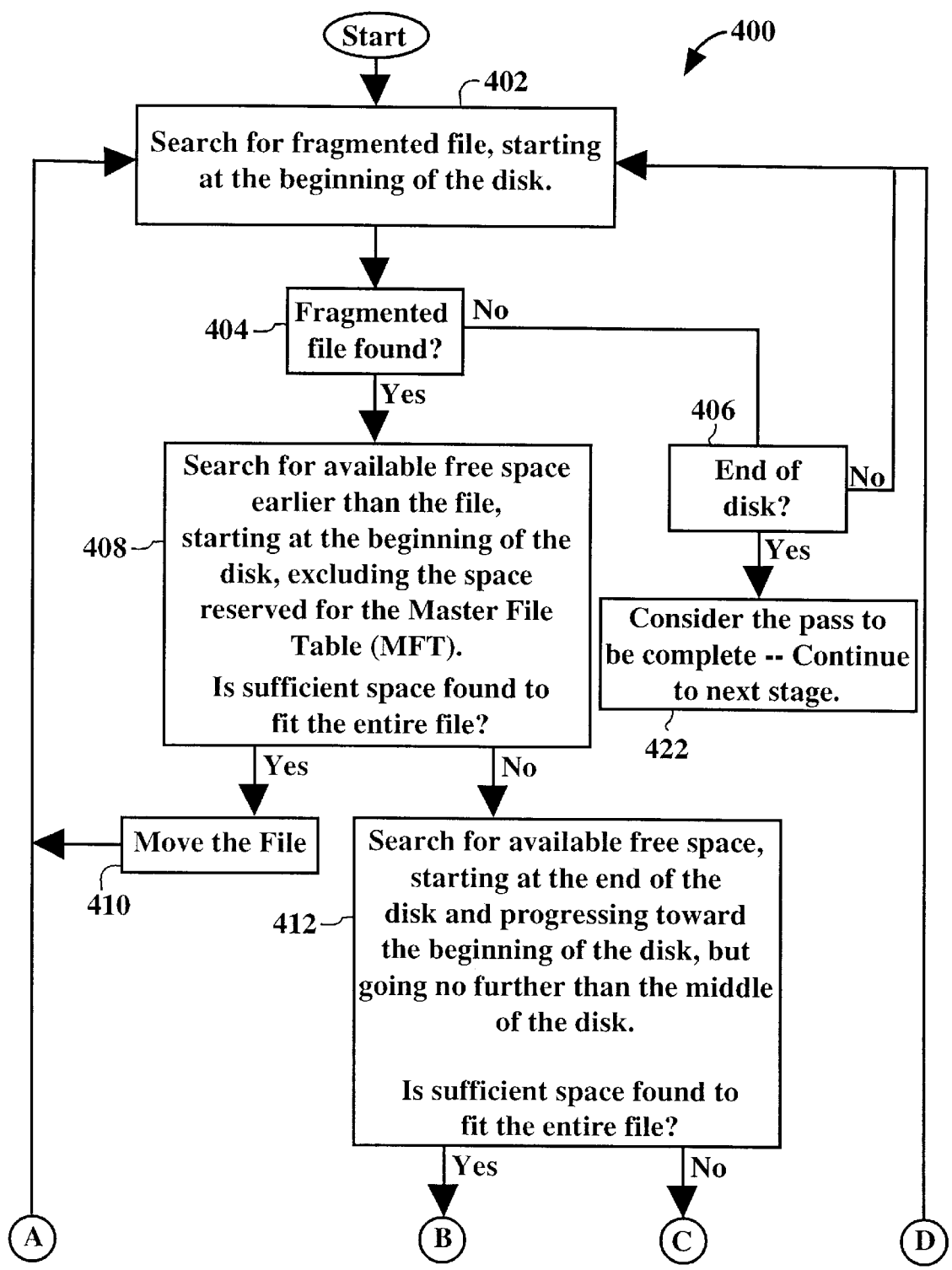
FIG. 4 is a flow diagram of the steps performed by the present invention during the defragmentation process of a NTFS partitioned disk drive in accordance with the present claimed invention.
Figure 4:
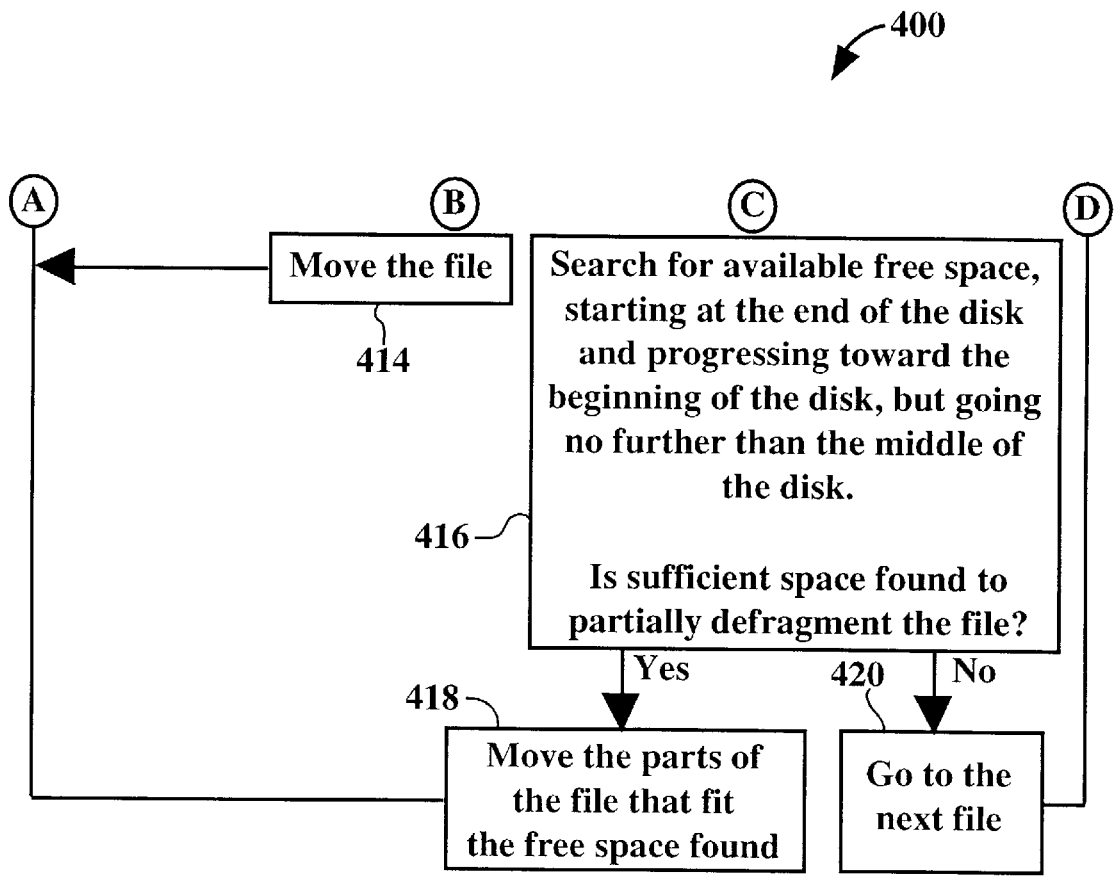

FIG. 4 is a flow diagram of an exemplary process flow 400 in accordance with the present invention. This flow diagram represents the first of three scans or tasks that are performed, in accordance with one preferred sequence for disks formatted in accordance with NTFS to identity fragmented files, minimize such fragments, and maximize the free space on the disk. It should be noted that process flow 400 of FIG. 4 does not process any files, whether fragmented or contiguous, in the MFT zone.

Process flow 400 identifies whether the file is fragmented and attempts to move the extents of such files to a contiguous location on disk 110 of FIG. 2A that is closer to the beginning of disk 110 than the current file location. This tends to pack the files toward the front of disk 110. If the files are unable to be moved forward, the extents of the file are moved toward the end of disk 110 and specifically to the last half of disk 110 between the middle and the end of disk 110.

If the lack of free space prohibits the file to be moved so that all extents are contiguous, the file is partially defragmented. Specifically, a portion of the file's extents are moved to free space near the end of disk 110 where the free space is no smaller than the square root of the total number of clusters in the file. This step tends to marginally reduce file fragmentation and gets the fragmented file out of the way so that enough contiguous free space can be consolidated to defragment this file on subsequent passes.

The present invention performs process flow 400 beginning with a search for files at the beginning of the disk as indicated at process step 402. The search process makes a procedure call to recover the MFT from disk 110 which is then stored, for example, in memory 106 of FIG. 1. The MFT is sorted to align the file records so that the files, as listed in the MFT, coincide with the order in which they are stored on disk 110. Once sorted, each file record is tested to determine whether the file is contiguous or stored in fragments as indicated at process step 404.

If the file is contiguous, the file is not moved and the process flow proceeds to step 406. However, if the file is fragmented, the process proceeds to search step 408. Search step 408 searches disk 110 for free disk space, that is disk space which is available for file storage, starting at the beginning of the disk but not including the MFT zone 234 (FIG. 2B). Search step 408 scans for free space sufficient to store the file extents.

If sufficient space is found, the present invention moves the file to the new space, updates the MFT and deallocates the old file extents as indicated at step 410. The present invention then returns to search for the next file at step 402. The process flow to this point tends to pack the files on the disk toward the beginning of the disk. However, if the size of the available free spaces in the scanned area of disk 110 are too small relative to the size of the file, the file is not moved and all fragments remain in their original location.

The process flow 400 then proceeds to a search step 412 to search for free space.

Search step 412 scans disk 110 for free space of sufficient size beginning at the end of the disk and proceeding toward the middle of the disk. If sufficient space is found the file is moved to the new space, the MFT is updated and the old file extents de-allocated as indicated at step 414. Process flow then returns to search for the next file at step 402. Otherwise, the present invention proceeds with a partial defrag search, as indicated at step 416.

If the available free space in the area of the disk 110 scanned during search 412 is too small relative to the size of the file, the partial defrag search 416 scans disk 110 for free space of sufficient size to at least partially defragment the file. The scan begins at the end of the disk and proceeds toward the middle of the disk. If sufficient space is found to at least partially defragment the file, extents are moved to the new space, the MFT updated and the old file extents de-allocated as indicated at step 418. After moving the file extents or, if there waspinsufficient space to at least partially defragment the file as indicated at step 420, the process flow 400 returns to search for the next file at step 402.

The search and move process as described by steps 402–420 continues until all files have been selected and evaluated for fragmentation and the search has reached the end of disk 110. When the end of the disk is detected, the present invention branches to process step 406. The first process flow is considered to be complete and the process proceeds to transfer step 422 which invokes the second NTFS process flow 500 of the present invention.

2. NTFS PROCESS FLOW #2

Figure 5:
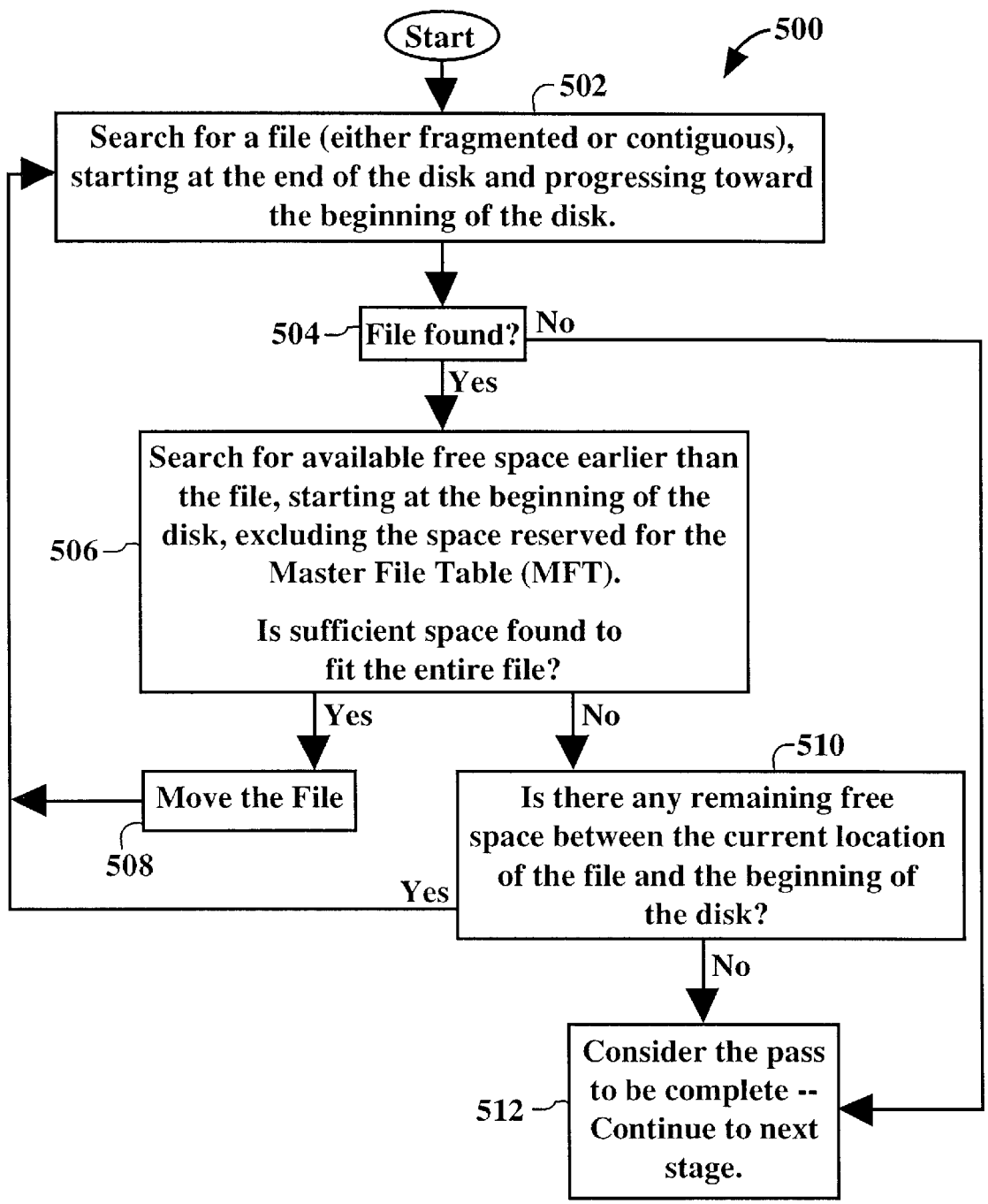
FIG. 5 is another flow diagram of steps performed by the present invention during the defragmentation process of the NTFS partitioned disk drive in accordance with the present claimed invention.

FIG. 5 is a flow diagram of an exemplary process flow 500 in accordance with the present invention. This flow diagram represents the second of three tasks that are performed by the present invention, in accordance with the defragmentation sequence discussed below. Process flow 500 attempts to move both fragmented and contiguous files from the end of the disk toward the front of the disk. Fragmented files are defragmented as they are moved. As with process flow 400, process flow 500 does not process any files, whether fragmented or contiguous, in the MFT zone.

In process flow 500, the present invention attempts to locate free space on the disk as close to the beginning of the disk as possible. This tends to move files from the back of the disk and pack them toward the front of the disk. The process flow ends when there are no free spaces available that are closer to the beginning of the disk than the current location of the file.

Search step 502 of process flow 500 scans disk 110 for both fragmented and contiguous files. The scan begins at the end of the disk and proceeds toward the beginning of the disk. As each file is found, control is passed to search step 506 or, if no files are found because the beginning of the disk has been reached, to transfer step 512 as indicated at step 504.

Search step 506 scans disk 110 for free space of sufficient size between the file's current location and the beginning of the disk, excluding the space reserved for the MFT. If sufficient space is found the file is moved to the new space, the MFT updated and the old file extents de-allocated as indicated at step 508. Process flow then returns to search for the next file at step 502. Otherwise, process flow 500 proceeds to search step 510 to determine whether additional free space between the file's location (before the move) and the beginning of the drive is available. If such space is available, the process flow proceeds again to step 502 to locate the next file. However, if no available free space is detected, then the files are substantially fully packed toward the beginning of the disk with substantially all of the free space tending to reside near the end of the drive. Accordingly, the process flow proceeds to transfer step 512 since searching for additional files to move will result in, at best, only limited additional defragmentation. Transfer step 512 invokes the third NTFS process flow 600.

3. NTFS PROCESS FLOW #3

Figure 6:
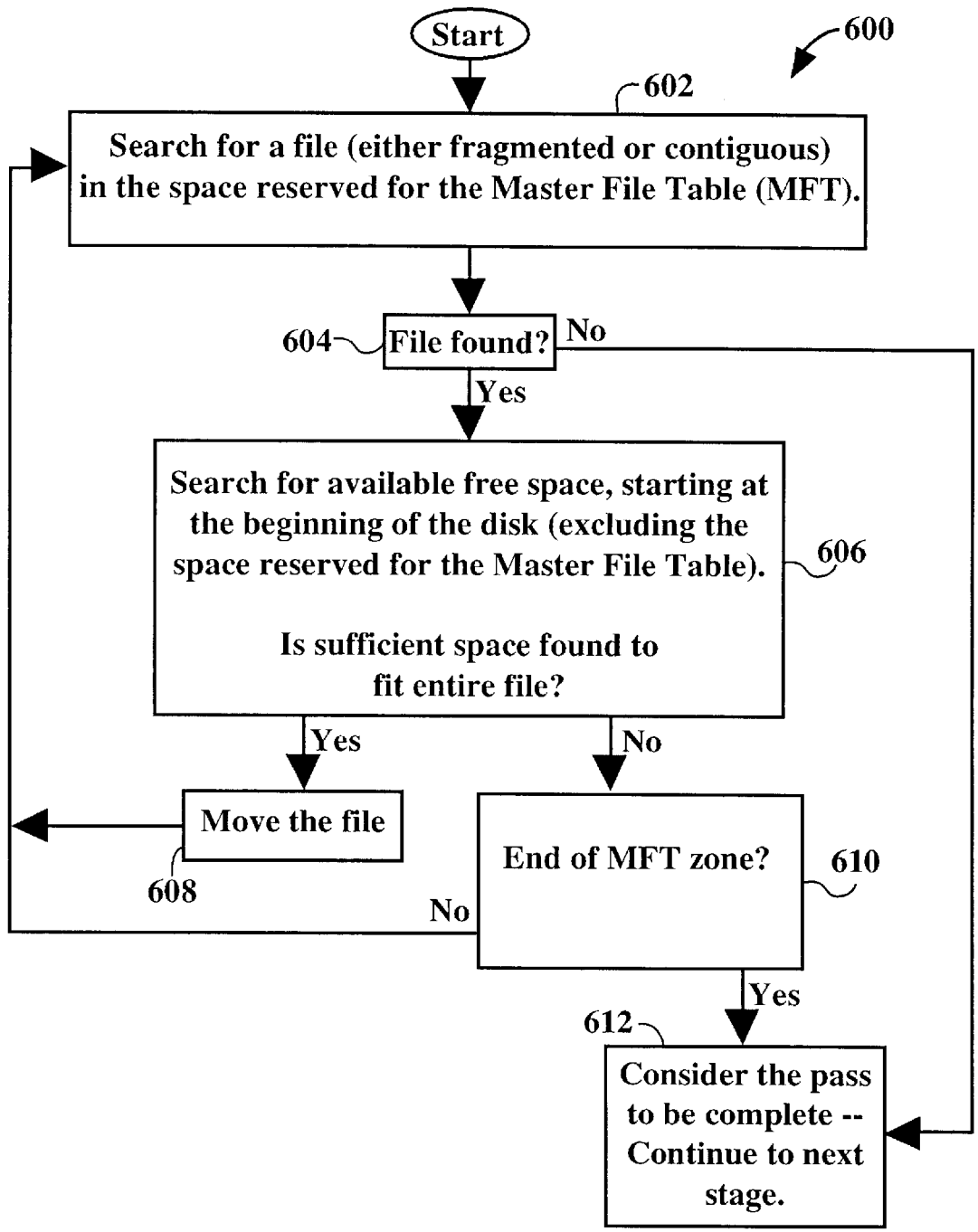
FIG. 6 is yet another flow diagram of steps performed by the present invention during the defragmentation process of the NTFS partitioned disk drive in accordance with the present claimed invention.

FIG. 6 is a flow diagram of an exemplary third process flow 600 in accordance with the present invention that represents the third of three tasks that are performed, in accordance with the defragmentation sequence discussed below. Flow process 600 moves both contiguous and fragmented files out of the MFT zone to the first available free space toward the beginning of the disk. Fragmented files are defragmented as they are moved.

Specifically, as indicated at search step 602, the MFT zone of the disk 110 is scanned from beginning to end for both fragmented and contiguous files that reside in the MFT zone. As each file is found, control is passed by step 604 to search step 606 or, if no files are found because the scan has reached the end of the MFT zone, to transfer step 612.

Search step 606 scans disk 110 for free space of sufficient size outside of the MFT zone into which to move the file. If free space is found, the file is moved, the MFT is updated and the old file extents de-allocated as indicated at step 608. Fragmented files are defragmented, at least in part, as they are moved out of the MFT zone. Process flow 600 then returns to search for the next file at step 602. Otherwise, the process flow proceeds to step 610 to determine whether the end of the MFT has been reached. If the end of the MFT zone has not been reached, process flow 600 returns to step 602 to locate the next file. However, if the end of the MFT zone has been reached, the present invention proceeds to transfer step 612.

4. NTFS PROCESS SEQUENCE

Real-time defragmentation of a NTFS disk drive in accordance with the present invention utilizes each of the above described process flows 400–600 in a sequential manner. In one embodiment, the NTFS process sequence invokes one of the above-described process flows 400–600 during each of six passes or scans. Specifically as shown below in Table 1, the NTFS process sequence begins with process flow 400 followed by process flow 500. However, at times few or no files will be moved during the first and second pass scans, such as might happen if the disk is heavily fragmented. Accordingly, process flows 400 and 500 are subsequently repeated during the third and fourth scans. The NTFS process sequence then proceeds to process flow 600 during the fifth scan to move files out of the MFT zone before again repeating process flow 500.

TABLE 1

| NTFS FILE SYSTEM DISK PROCESS SEQUENCE ||
| --- | --- |
| First Pass Scan: | Process Flow 400 |
| Second Pass Scan: | Process Flow 500 |
| Third Pass Scan: | Process Flow 400 |
| Fourth Pass Scan: | Process Flow 500 |
| Fifth Pass Scan: | Process Flow 600 |
| Sixth Pass Scan: | Process Flow 500 |

It has been determined that the above-noted sequence is preferable to merely moving files, whether fragmented or not, to a portion of the disk (for example, packing all files to the front of the disk) since the files on disk 110 may be so heavily fragmented that there is no free space of sufficient size in which to move a file making it is impossible to move any file. Accordingly, it is highly important to create sufficient free space as a first priority by partially defragmenting some of the files.

The first pass scan of the present invention advantageously selects fragmented files and moves each fragment toward the front of the disk thereby tending to pack files near the beginning of the disk and creating free space toward the end of the disk. If no space is available in the front of the disk, the fragments are moved to the end of the disk. The first pass scan proceeds from the front to the rear of the disk.

The second pass scan selects both fragmented and contiguous files and attempts to move each toward the beginning of the disk. This scan proceeds from the rear of the disk toward the beginning to pack files toward the front of the disk into the free space created after the first pass scan.

Process flows 400 and 500 are repeated since contiguous free space will be created by the partial defragmentation and rearrangement of files during the first and second scans. The third and fourth scans tend to further pack files toward the beginning of the disk thereby reducing free space fragmentation and minimizing any remaining file fragmentation.

It is preferred that files stored in the MFT zone are moved to prevent unnecessary fragmentation growth of the MFT but only when there is sufficient free space available on the disk to efficiently defragment the files. As will be appreciated, once files are moved out of the MFT zone, available free space is reduced since it is not possible to otherwise use free space in the MFT zone.

Accordingly, process flow 600 attempts to move files, whether fragmented or not, from the MFT zone to free space toward the beginning of the disk. The search for free space begins at the beginning of disk 110 and proceeds to the rear until space is located.

Finally, process flow 500 is repeated once again to further pack files toward the front of the disk. Operation of the NTFS process sequence then ceases until it is next invoked by the control center module 306.

In another embodiment of the present invention, three different tasks or disk scans are performed in an iterative manner if disk 110 has a FAT file system. The three tasks comprise processes that 1) identifying and minimizing fragmented files, 2) packing the files to maximize free space and 3) defragment fragmented files stored toward the end of the disk.

5. FAT PROCESS FLOW #1

Figure 7A:
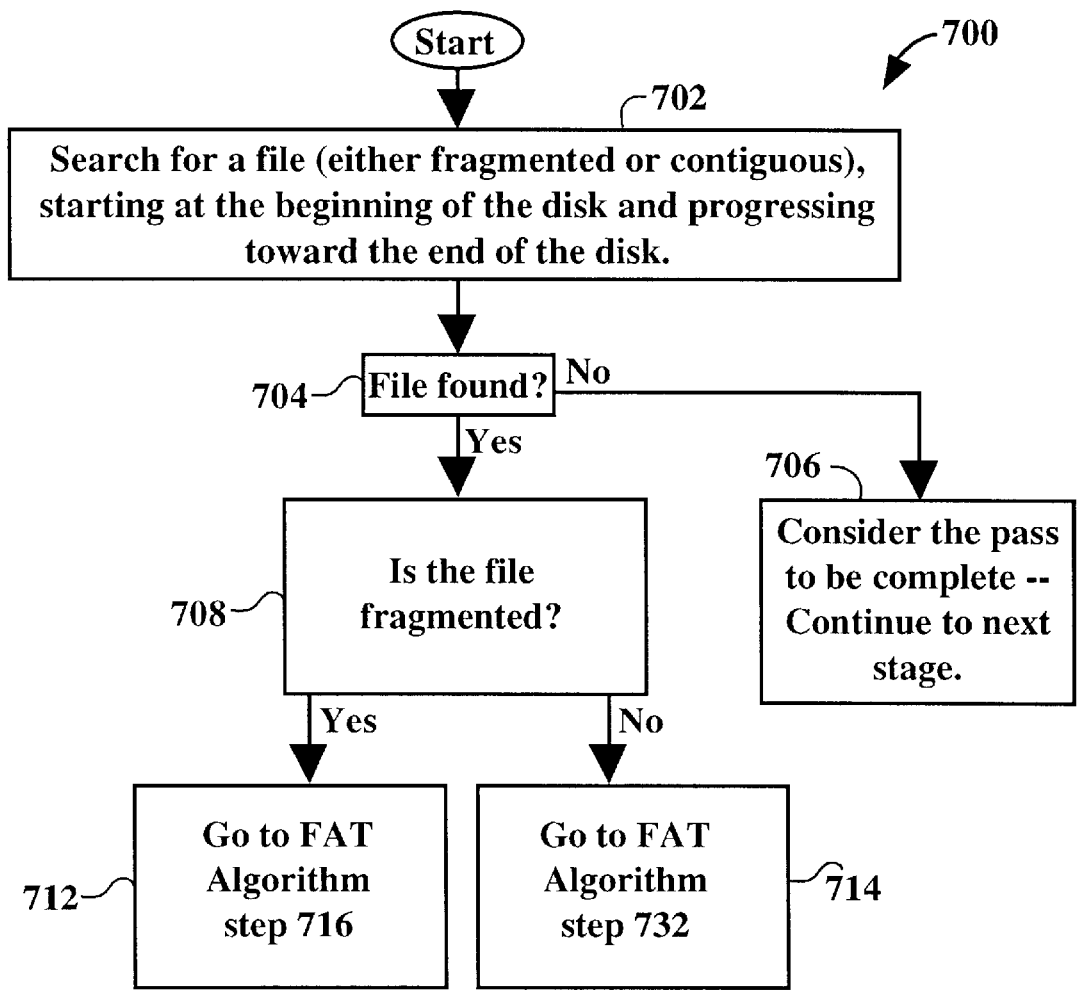
FIGS. 7A, 7B and 7C illustrate a flow diagram of steps performed by the present invention during the defragmentation process of a FAT partitioned disk drive in accordance with the present claimed invention.

FIG. 7A is a flow diagram of an exemplary process flow 700 in accordance with the present invention. This flow diagram represents the first of three scans or tasks that are performed, in accordance with a preferred sequence for FAT formatted disk drives.

In the present embodiment, process flow 700 starts with the file nearest the beginning of the disk and proceeds toward the end of the disk and attempts to move both fragmented and contiguous files to a position on disk 110 that is closer to the beginning of the disk than the current file location. This tends to pack the files toward the front of the disk. However, if the files are unable to be moved forward, a search of the back half of the disk is conducted to determine whether there is room to locate the entire file. If the lack of free space prohibits the file to be moved so that all extents are contiguous, the file is not moved.

Process flow 700 begins with a search for files at the beginning of the disk progressing to the end of the disk as indicated at search step 702. File locations are determined by issuing a procedure call to the operating system and obtaining a FAT entry for the first file. Each FAT entry includes retrieval pointers identifying the file location, the number of extents and a link to the next FAT entry. Once all FAT entries have been read, i.e., the entire disk has been scanned, process flow 700 proceeds to transfer step 706 having completed the scan of disk 110. If, however, additional files exist, process flow 700 proceeds to step 708 where the file is tested to determine whether it is fragmented or contiguous. The process flow proceeds to transfer step 712 if the file is fragmented or to transfer step 714 if the file is contiguous.

Figure 7B:
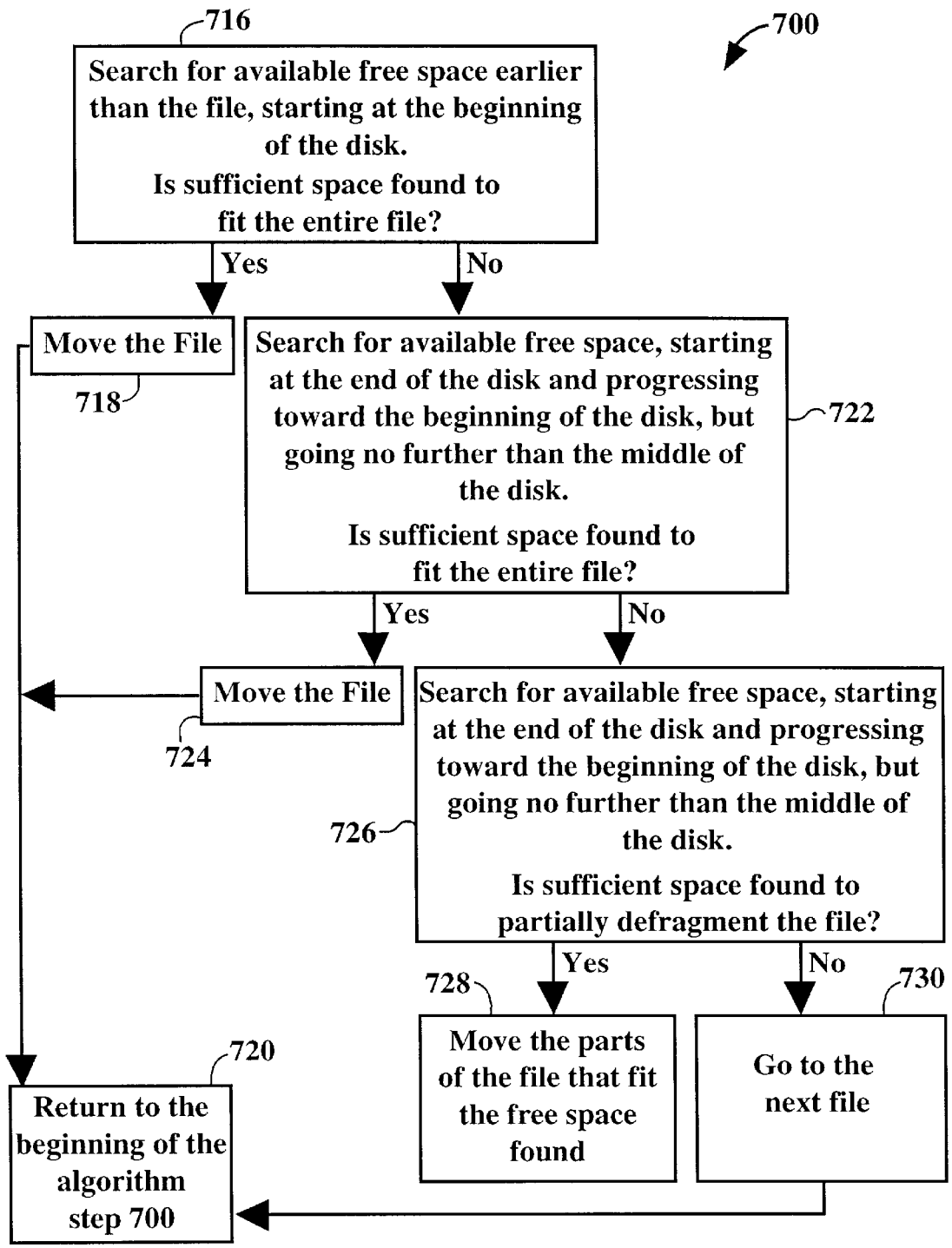

Referring now to FIG. 7B, search step 716 scans disk 110 for free disk space, that is, disk space which is available for file storage, between the beginning of the disk and the file's current location. If search step 716 finds sufficient free space to store all fragments of the file, the file is moved to the new space, the FAT is updated and the old file extents de-allocated as indicated at step 718. Process flow then returns to search for the next file at step 702 as indicated at step 720. As will be appreciated, the process flow to this point tends to pack the files on the disk toward the beginning of the disk. However, if the size of the available free spaces in the scanned area of disk 110 are too small relative to the size of the file, the file is not moved and process flow proceeds to search step 722.

Search step 722 scans disk 110 for free space of sufficient size beginning at the end of the disk and proceeds toward, but no further than the middle of the disk. If sufficient space is found the file is moved to the new space, the FAT updated and the old file extents de-allocated as indicated at step 724. Process flow then returns to search for the next file as indicated at step 720. Otherwise, the process flow proceeds with a partial defrag search, as indicated at step 726.

If the available free space in the area of the disk 110 scanned during the third search is too small relative to the size of the file, the partial defrag search again scans disk 110 for free space of sufficient size to at least move some of the file extents to contiguous locations. The scan begins at the end of the disk and proceeds toward, but no further than the middle of the disk. If sufficient space is found to at least partially defragment the file, fragments are moved to the new space, the FAT is updated and the old file extents that have been moved are deallocated as indicated at step 728. After moving the file extents, the process flow returns to search for the next file as indicated at step 720. If the fragments exceed the size of available disk space, none of the fragments are moved and process flow proceeds to steps 730 and 720.

One skilled in the art will appreciate that scans 722 and 726 may be combined into a single scan by building a scan map of available disk space. The scan map would note de-allocated areas where the entire file or alternatively portions of the file could be moved thereby eliminating the need to perform scan 726.

Figure 7C:
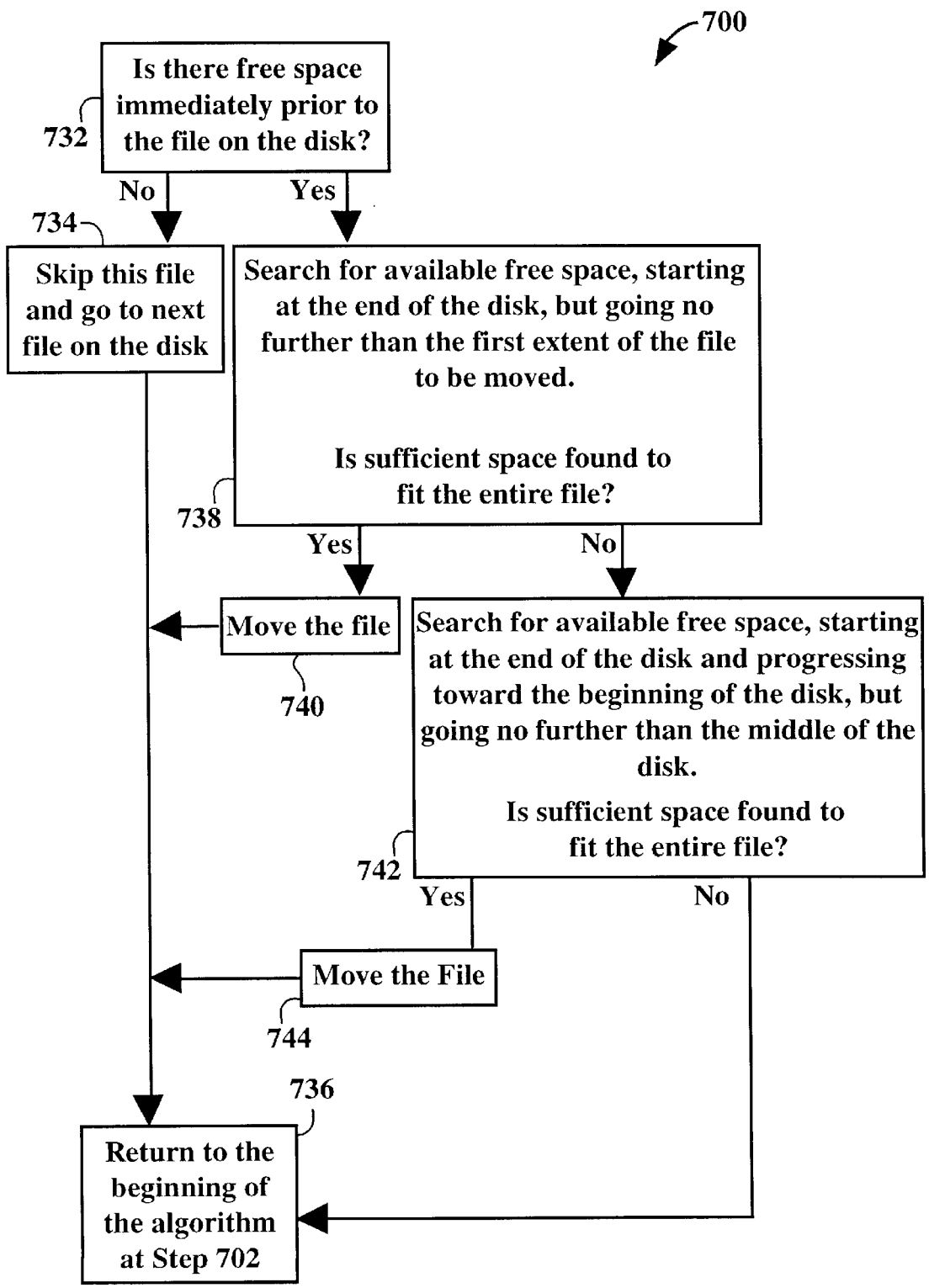

Referring now to FIG. 7C, step 732 determines whether there is free disk space immediately prior to the file. Since the current file is already contiguous (see FIG. 7A, step 708), further process of the file will only occur if available space can be defragmented. Specifically, if the contiguous file abuts at least one cluster of free space, the file will be moved to create a contiguous free space that is at least one cluster larger than the size of the contiguous file. Correspondingly, the file will not be moved if it abuts another file because it will not be possible to develop larger free space by the move. Accordingly, process flow skips the file and proceeds to search for the next file as indicated at steps 734 and 736.

If, however, free space is detected, the process flow 700 initiates a scan of disk 110 for free disk space between the beginning of the disk and the file's current location as indicated at search step 738. If search step 738 finds sufficient free space to store the entire file, the file is moved to the new space, the FAT is updated and the old file extents de-allocated as indicated at step 740. Process flow 700 then returns to search for the next file at step 702 as indicated at step 736. As will be appreciated, process flow 700 to this point tends to pack the files on the disk toward the beginning of the disk. If the size of the available free spaces in the scanned area of disk 110 are too small relative to the size of the file, the file is not moved and process flow proceeds to search step 742.

Search step 742 scans disk 110 for free space of sufficient size beginning at the end of the disk and proceeds toward, but no further than the middle of the disk. If sufficient space is found the file is moved to the new space, the FAT updated and the old file extents de-allocated as indicated at step 744. Process flow then returns to search for the next file as indicated at step 736.

6. FAT PROCESS FLOW #2

Figure 8:
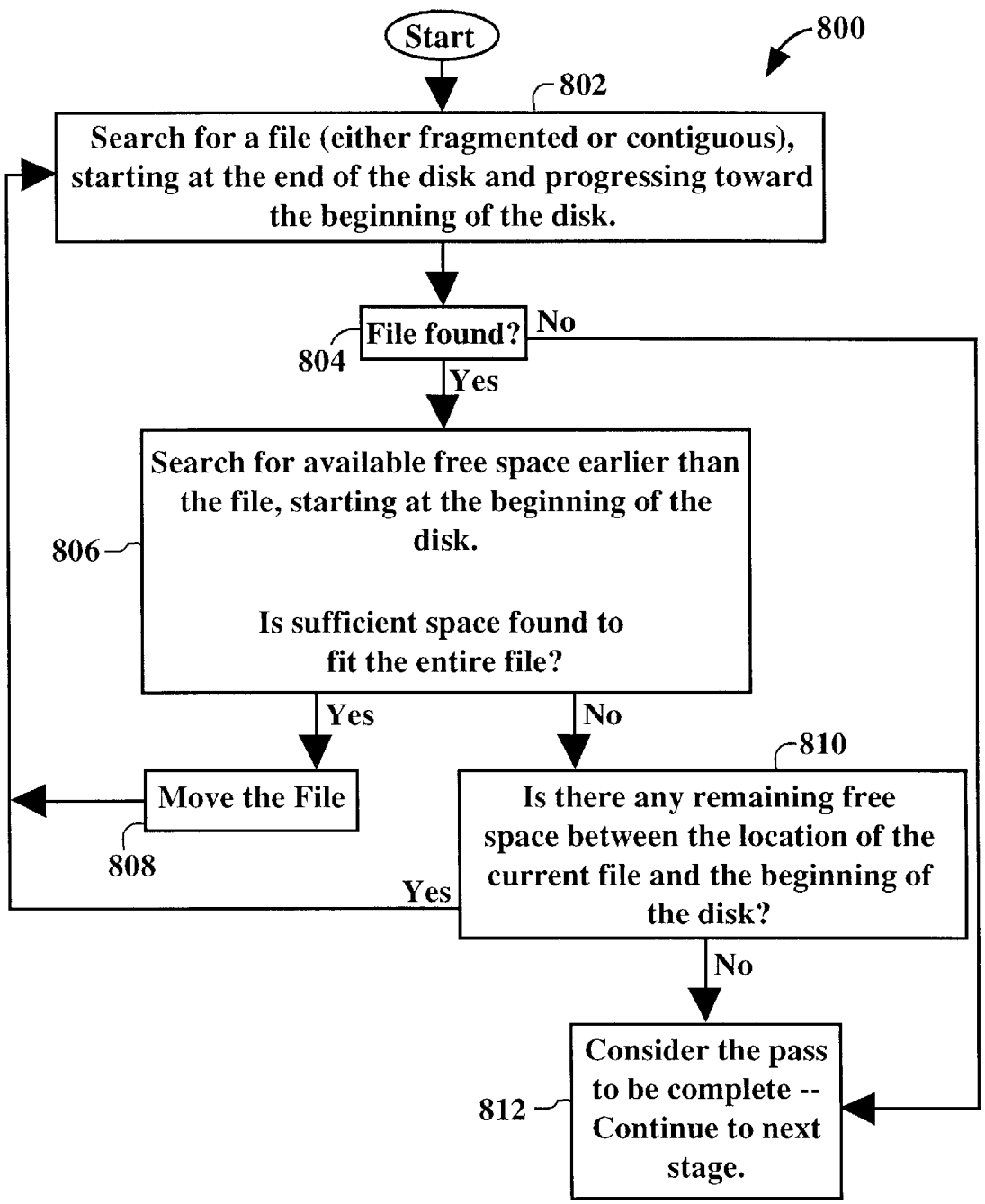
FIG. 8 is another flow diagram of steps performed by the present invention during the defragmentation process of the FAT partitioned disk drive in accordance with the present claimed invention.
Figure 9:
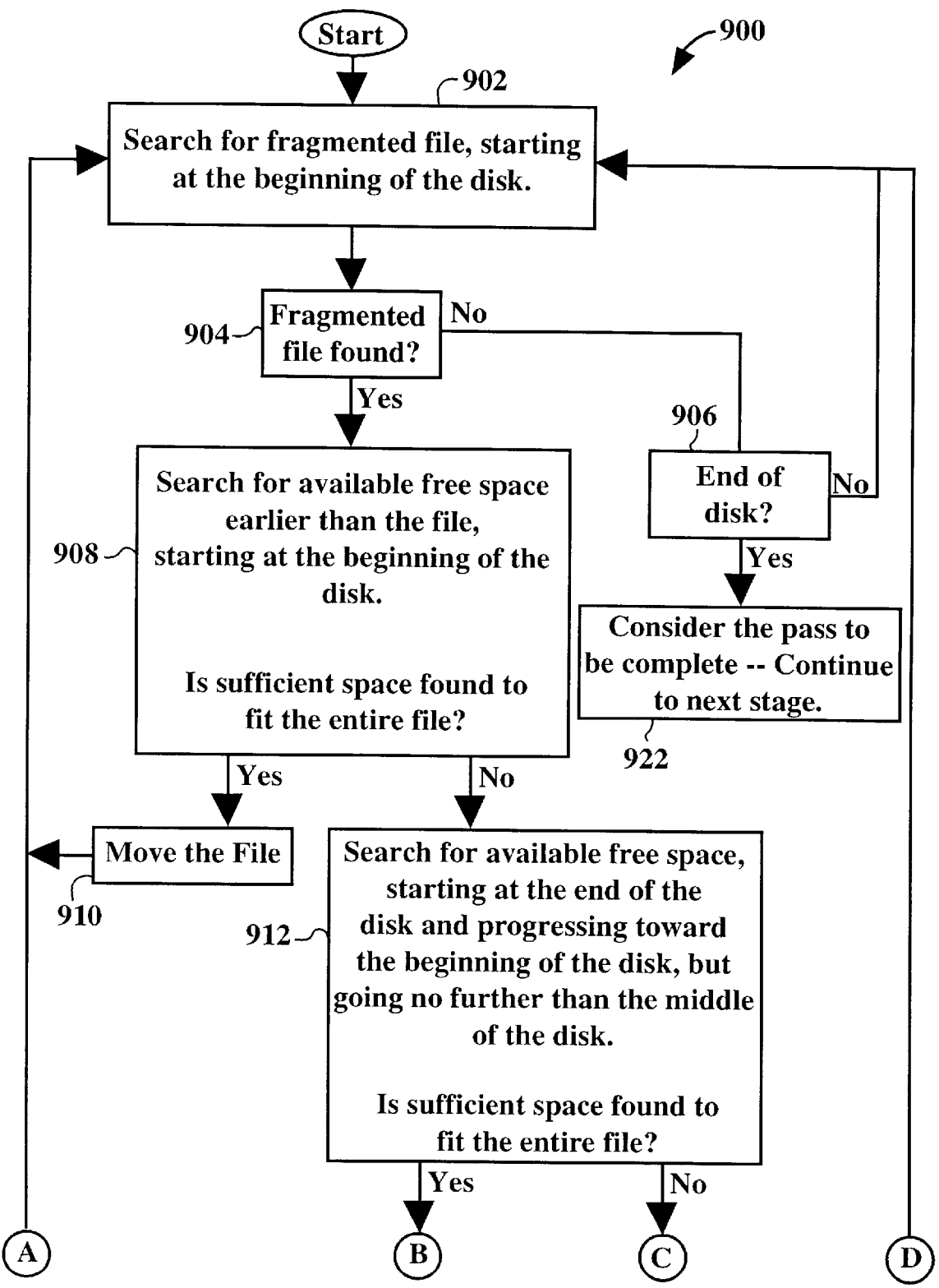
FIG. 9 is yet another flow diagram of steps performed by the present invention during the defragmentation process of the FAT partitioned disk drive in accordance with the present claimed invention.
Figure 9:
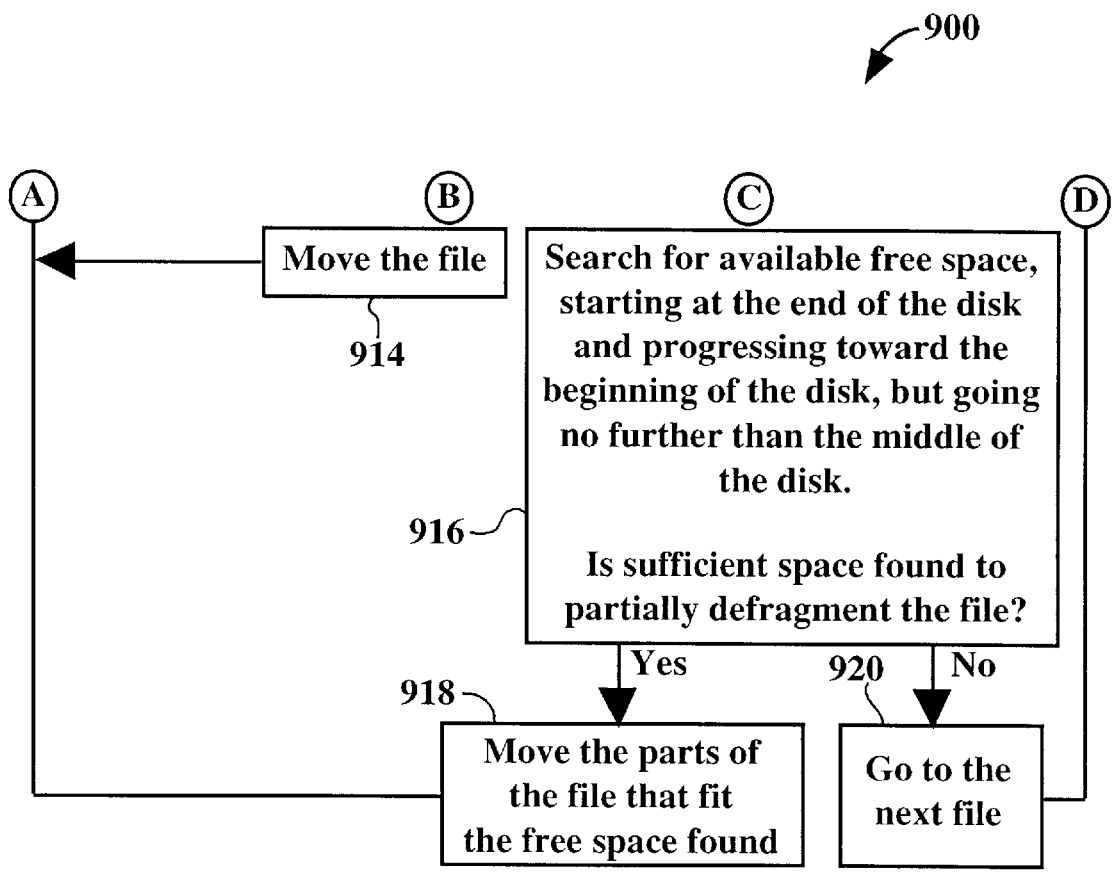

FIG. 8 is a flow diagram of an exemplary process flow 800 in accordance with the present invention. This flow diagram represents the second of three tasks that are performed, in accordance with the defragmentation sequence discussed below. Process flow 800 attempts to move both fragmented and contiguous files from the end of the disk toward the front of the disk. Fragmented files are defragmented as they are moved.

Search step 802 of process flow 800 scans disk 110 for both fragmented and contiguous files. The scan begins at the end of the disk and proceeds toward the beginning of the disk. As each file is found, control is passed to search step 806 or, if no files are found because the beginning of the disk has been reached, to transfer step 812 as indicated at step 804.

Search step 806 scans disk 110 for free space of sufficient size between the file's current location and the beginning of the disk. If sufficient space is found the file is moved to the new space, the FAT is updated and the old file extents deallocated as indicated at step 808. Process flow then returns to search for the next file at step 802. Otherwise, the process flow proceeds to search step 810 to determine whether there is any free space beginnings file's location and the beginning of the drive. If such space is available, the process flow proceeds again to step 802 to locate the next file. However, if no available free space is detected, then the files are already substantially fully packed toward the beginning of the disk with substantially all of the free space tending to reside near the end of the drive. Accordingly, the process flow proceeds to transfer step 812 which invokes the third FAT process flow 900.

7. FAT ALGORITHM #3

Process flow 900 starts with the file nearest the beginning of the disk and proceeds toward the end of the disk and attempts to move only fragmented files to a position on disk 110 that is closer to the beginning of the disk than the current file location. This tends to pack the files toward the front of the disk. However, if the files are unable to be moved forward, a search of the back half of the disk is conducted to determine whether there is room to locate the file or to at least partially defragment the file.

Process flow 900 begins with a search for fragmented files at the beginning of the disk as indicated at process step 902. If one of the files is fragmented (see step 904), the process proceeds to search step 908. Search step 908 searches disk 110 for free disk space, starting at the beginning of the disk and proceeding to the location of the file. Search step 908 scans for free space sufficient to store all fragments of the file.

If sufficient space is found, the file is moved to the new space, the FAT is updated and the old file extents de-allocated as indicated at step 910. Process flow then returns to search for the next file at step 902. The process flow to this point tends to pack the files on the disk toward the beginning of the disk. However, if the size of the available free spaces in the scanned area of disk 110 are too small relative to the size of the file, the file is not moved and all fragments remain in their original location. The process flow then proceeds to a search 912.

Search step 912 scans disk 110 for free space of sufficient size to make the file contiguous. The scan begins at the end of the disk and proceeds toward, but no further than the middle of the disk. If sufficient space is found the file is moved to the new space, the FAT is updated and the old file extents de-allocated as indicated at step 914. Process flow then returns to search for the next file at step 902. Otherwise, the process flow proceeds with a partial defrag search 916.

If the available free space in the area of the disk 110 scanned during the third search is too small relative to the size of the file, the partial defrag search 916 scans disk 110 for free space of sufficient size. The scan begins at the end of the disk and proceeds toward, but no further than, the middle of the disk. If sufficient space is found to at least partially defragment the file, fragments are moved to the new space, the FAT is updated and the old file extents de-allocated as indicated at step 918. After moving the file extents the process flow returns to search for the next file at step 902. If there was insufficient space to at least partially defragment the file, the process flow returns to search for the next file at step 902 as indicated at step 920.

The search and move process as described by steps 902-920 continues until all files have been selected and evaluated for fragmentation and the search has reached the end of disk 110. When the entire disk has been searched, the process flow branches to process step 906. Then process flow 900 is considered to be complete and the process proceeds to transfer step 922 which invokes the next process flow in accordance with the FAT process sequence.

8. FAT PROCESS SEQUENCE

Defragmentation of a disk drive with a FAT file system utilizes the above described process flows 700–900 in a sequential manner. In one preferred embodiment, the FAT process sequence invokes one of the process flows during each of six passes or scans of disk 110. Specifically as shown below in Table 2, the FAT process sequence begins with process flow 700 and then proceeds to process flow 800, repeats process flows 700 and 800 during the third and fourth scans. The process sequence proceeds to process flow 900 during the fifth scan before repeating process flow 800.

TABLE 2

FAT FILE SYSTEM DISK PROCESS SEQUENCE

| | |
|---|---|
| First Pass Scan: | Process Flow 700 |
| Second Pass Scan: | Process Flow 800 |
| Third Pass Scan: | Process Flow 700 |
| Fourth Pass Scan: | Process Flow 800 |

TABLE 2-continued

FAT FILE SYSTEM DISK PROCESS SEQUENCE

| Fifth Pass Scan: | Process Flow 900 |
| Sixth Pass Scan: | Process Flow 800 |

It is important to create sufficient free space as a first priority so the first pass scan selects both fragmented and contiguous files and moves each toward the front of the disk with fragmented files being at least partially defragmented thereby. This step tends to pack files near the beginning of the disk and creates free space toward the end of the disk. The first pass scan proceeds from the front to the rear of the disk.

The second pass scan selects both fragmented and contiguous files and attempts to move each toward the beginning of the disk. This scan proceeds from the rear of the disk toward the beginning to pack files toward the front of the disk into the free space created after the first pass scan and tends to defragment files as they are moved.

Process flows 700 and 800 are then repeated to take advantage of the free space created during the first and second pass scans so as to further minimize file fragmentation and pack contiguous files toward the beginning of the disk.

The fifth pass scan advantageously selects fragmented files and moves each extent toward the front of the disk thereby tending to pack files near the beginning of the disk and creating free space toward the end of the disk. If no space is available in the front of the disk, the fragments are moved to the end of the disk in order to create contiguous free space.

The sixth and final scan tends to perform one additional pass to move files toward the beginning of the disk. Defragmentation may be accomplished by merely proceeding through the first set of three scans but it was determined that defragmentation is significantly improved by proceeding with the second set of three scans thereafter.

9. INTERFACE WITH THE OPERATING SYSTEM

In the preferred embodiment of the present invention, four operating system functions are implemented for the NTFS and FAT file systems. Three of the functions provide information regarding disk 110 and the files stored thereon while the fourth function moves file extents. Each of the functions are accessed by issuing an I/O Control (IOCTL) function and passing File System Control (FSCTL) information. When the operating system is called, the FSCTL arguments are checked and the appropriate function call is made.

For NTFS file systems, the four functions are: 1) NtfsGetVolumeData; 2) NtfsGetVolumeBitmap; 3) NtfsGetMftRecord and 4) NtfsMoveFile. The NtfsGetVolumeData function retrieves data about the NTFS disk or volume and returns the data to a buffer in RAM 106 (see FIG. 1) accessible by control center module 306 and the NTFS defrag engine 308 and NTFS FAU engine 310 (see FIG. 3). The volume data returned by the function includes the serial number of the volume, the number of sectors, total number of clusters as well as the number of free clusters, the logical cluster number where the MFT file starts as well as the length of the table, and defines the boundaries of the MFT zone.

The NtfsGetVolumeBitmap function retrieves the bit map of the volume where each cluster of the volume is represented by a single bit. A set bit defines a cluster that is in use for storing a file. A zero bit defines a cluster that is available free space. The function may retrieve the bit map for the entire volume or for a portion of the volume by specifying a starting LCN and buffer size. The volume bit map is returned to a buffer in RAM 106 (see FIG. 1). Analysis of the volumedata and the bit map by NTFS FAU 310 (FIG. 3) provides information regarding the starting location of free space on the volume and the size of the free space.

The NtfsGetMftRecord function retrieves an MFT file record segment specified by the input parameters passed by the function. The file record segment for the specified file is returned to a buffer in RAM 106 (see FIG. 1). The file record segment is used by NTFS defrag engine 308 (FIG. 3) to determine whether the file is to be moved and where. If it is determined that a file is to be moved, engine 308 issues an NtfsMoveFile function call.

The NtfsMoveFile function moves all or a portion of a file to a specified location on the volume. The start of the file to be moved is defined by the starting virtual cluster number (VCN) where VCN(0) defines the beginning of the file. The starting logical cluster number defines the location on disk 110 where the file is to be moved where, by way of example, LCN(0) defines the first or starting cluster of the volume. A cluster count defines the number of clusters of the file to move. The NtfsMoveFile function provides for moves of either an entire file or portions of a file. Any file that is not in exclusive use may be moved, including files that are currently being modified. Synchronization of data between disk 110 and memory 106 (or to a cache memory (not shown) if available) is automatically handled by the NtfsMoveFile function.

For FAT file systems, the four functions are: 1) FatQueryBpb; 2) FatGetVolumeBitmap; 3) FatGetRetrievalPointers and 4) FatMoveFile. The FatQueryBpb function retrieves necessary data describing a selected FAT volume, for example disk drive 110, which is stored in the basic input/output system (BIOS) parameter block (Bpb). The function returns the data to RAM 106 (FIG. 1) for access by control center module 306.

The FatGetVolumeBitmap function retrieves the volume bit map or a portion as specified by the starting LCN input parameter passed by the function call to the operating system. The volume bit map data is returned to RAM 106 (FIG. 1) for access by control center module 306 and the FAT defrag engine 312 and FAT FAU engine 314. Analysis of the volume data and the bit map by FAT FAU 314 (FIG. 3) provides information regarding the starting location of free space on the volume and the size of the free space.

The FatGetRetrievalPointers function retrieves the retrieval pointers (extents) of a selected FAT file starting at a specified VCN of a file passed by the function call to the operating system. The retrieval pointers are used by FAT defrag engine 312 (FIG. 3) to determine whether the file is to be moved. If it is determined that a file is to be moved, engine 312 issues a FatMoveFile function call.

The FatMoveFile function moves all or a portion of a file to a specified location on the volume. The start of the file to be moved is defined by a starting virtual cluster number with VCN(0) defining the beginning of the file. The starting logical cluster number defines the location on the disk where the file is to be moved where LCN(0) defines the starting cluster of the volume at the beginning 22 (see FIG. 2A) of disk 110. The function also defines the number of clusters comprising the selected file to move.

To determine the location and size of contiguous free space on a selected volume, the NtfsGetVolumeBitmap function is called for NTFS volumes and the FatGetVolumeBitmap function is called for FAT volumes. In order to determine the number of extents of a file the NtfsGetMftRecord and/or the FatGetRetrievalPointers are called for NTFS and FAT volumes, respectively. The process flows 400–600 and 700–900 (for NTFS and FAT volumes, respectively) are then invoked in accordance with the respective sequences described above for defragmenting NTFS and FAT drives to determine when and where a selected file is to be moved. When it is determined that the selected file or portions of the selected file is to be moved, the NtfsMoveFile or the FatMoveFile functions are called above in accordance with the corresponding file system for NTFS and FAT volumes, respectively.

Referring again to FIG. 2B and FIG. 3, when a file or extent is to be moved (based upon evaluation of the volume bit map and the above described process flows), defrag engine 308 or 312 passes a target LCN to the appropriate move file function (that is, either the NtfsMoveFile or the FatMoveFile function). Using the LCNi, the move file function moves the file or extent to the new target location even if computer system 100 is active and has on-line users initiating read or write requests to the disk 110. By way of example, VCN0 at 230 in FIG. 2B, may be identified and moved to a new location, such as, for example to one of the LCN's generally designated at 232.

The target LCN is determined by reading the volume bit map to identify available free space on disk 110 of sufficient size to store the desired file or file extents. The volume bit map comprises a plurality of bits retained in memory 106 where each bit represents a corresponding cluster on disk 110. If a cluster is free, the bit is set to a level to indicate that the cluster is unused. Correspondingly, if the cluster contains a file extent, the bit is set to a level to indicate that the cluster is not available. The move file function scans the volume bit map and confirms that free space is available at the target location specified by the LCNi. A request is then issued to the operating system to allocate the space beginning at the specified LCNi. In response, the operating system confirms that the space on disk 110 has been allocated and the move file function proceeds with the task of moving the file or file extents. Upon completion of the move, the prior space on disk 110 is deallocated and the MFT file record (or the FAT file record if disk 110 is a FAT volume) is updated to reflect the new location.

The above process is repeated until all clusters of the file have been moved. As will be appreciated by one skilled in the art, the file or file extents are actually moved from the original locations on disk 110 into system cache of central processor 104 before being moved to the new disk location specified by the target LCNi. Upon completion of the move of all cluster of the file, the file record gets updated and flushed to disk 110 so that the file location or locations, as stored on disk 110, are accurately reflected. Similarly, the volume bit map is updated so that the bits corresponding to the previous file location are reset to indicate their availability while the bits corresponding to the new file location are set to indicate their unavailability. The file record and the volume bit map are then flushed to disk 110. If a file or portion of a file is stored in cache, such as might occur if the file is being used, it will be appreciated that the read from disk 110 to cache is redundant and may be omitted.

In summary, the process flows 400–900 of the present invention defragments files on disk 110 while computer system 100 continues operation of other application programs including the transfer of files (or portion of files) between disk drive 110 and RAM 106. Further, rather than moving substantially every file stored on disk drive 109, the present invention moves only a percentage of files on the drive. By way of example, in a disk drive 109 having 5000 stored therein (assume that fifty percent of the files are fragmented and fifty percent of the files are contiguous), the present invention will move each of the fragmented files but typically need only move about 40% of the contiguous file to substantially defragment the disk.

Although improvement in system efficiency is difficult to quantify due to the wide variety of disks 110 and file structures, the process flows of the present invention is believed to improve file transfer rates by at least 20% in comparison to a disk where a high percentage of files have more than one fragments. Under controlled environment using uniformly fragmented files (average of 6.2 fragments per file), the time to read every file from disk to memory improved from 8.06 minutes to 4.65 minutes, an improvement of about 73%, using a dual Pentium processor (Pentium is a trademark of Intel Corporation) operating at 90 Mhz and Windows NT, version 4.0 with NTFS formatted volumes when the volume was defragmented in accordance with the present invention. The time to read and then write every file on the disk improved from 22.13 minutes where, on average, each file had 6.2 fragments to 4.65 minutes (average of one fragment per file). This is an indicated improvement of about 30%. As the average number of fragments per file increases, the improvement in disk access and file transfer will also increase.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. In a computer system comprising a processor, an address/data bus coupled to said processor; a computer readable memory coupled to communicate with said processor, a method performed by said processor for defragmenting a random access storage device where information is stored in files, and where information regarding the location of the files is contained in a master file table stored in a master file zone, the method comprising the steps of:

invoking a first process flow to select a fragmented file having a plurality of non-contiguous extents and moving each extent toward the front of the disk thereby tending to pack files near the beginning of the disk and creating free space toward the end of the disk, said first process flow further comprises the steps of:

identifying a fragmented file having a plurality of non-contiguous extents;

moving the file extents to a contiguous free space on the storage device that is closer to the beginning of the disk than the current file location of the first extent of the fragmented file;

moving the file extents toward the end of the disk if contiguous free space is unavailable closer the beginning of the disk than the current file location of the first extent of the fragmented file so as to at least partially defragment the fragmented file, said step of moving the file extents toward the end of the disk occurring when the contiguous free space is no smaller than the square root of the total number of clusters in the fragmented file so as to at least partially defragment the fragmented file;

invoking a second process flow to select fragmented and contiguous files and moving the files toward the beginning of the disk;

repeating the first and second process flow so as to further minimize file fragmentation and pack contiguous files toward the beginning of the storage device;

invoking a third process flow to move fragmented files and contiguous files from the master file table zone to free space; and invoking the second process flow to move files toward the beginning of the storage device.

2. The method as recited in claim 1 wherein the processor performed first process flow further comprises the step of moving file extents toward the end of the storage device if the free space is unavailable toward the front of the storage device.

3. The method as recited in claim 1 wherein the processor performed first process flow further comprises the step of selecting files located toward the front of the storage device and proceeding thereafter to select files located toward the end of the storage device.

4. The method as recited in claim 1 wherein the processor performed second process flow further comprises the step of proceeding from the rear of the storage device toward the beginning of the storage device so as to pack files toward the beginning of the storage device into the free space created after the first process flow.

5. The method as recited in claim 1 wherein the processor performed third process flow further comprises the step of searching for free space beginning at the beginning of the storage device and proceeding to the end of the storage device until sufficient contiguous free space is located to move at least one of the fragmented files or at least one of the contiguous files from the master file table zone to the free space.

6. The method as recited in claim 1 wherein the processor performed identifying step further includes the steps of:

recovering the master file table from the random access storage device;

sorting the master file table to align the file records to coincide with the files are stored on the random access storage device testing each file record to determine whether the corresponding file is contiguous or fragmented;

searching for contiguous free space between the beginning of the disk and the beginning of the master file table zone sufficient to contiguously store substantially all extents of the file corresponding to the current file record; and moving the file extents to the contiguous free space.

7. The method as recited in claim 1 wherein the processor performed first process flow further comprises the steps of:

searching for free space between the end of the storage device and the middle of the storage device sufficient to store all fragments of the file corresponding to the current file record; and searching for free space between the end of the storage device and the middle of the storage device sufficient to store at least two of the extents of the file corresponding to the current file record and moving the at least two file extents to the contiguous free space.

8. The method as recited in claim 1 wherein the processor performed second process flow further comprises the steps of:

searching the storage device for fragmented files and contiguous files located proximate to the end of the storage drive and proceeding to fragmented files and contiguous files located proximate to the beginning of the storage device;

searching the storage device for contiguous free space of sufficient size between the file's current location and the beginning of the disk in which to contiguously store at least two extents of the fragmented files or at least one of the contiguous files; and moving the at least two extents of the fragmented file or the contiguous file to the contiguous free space.

9. The method as recited in claim 8 wherein the processor performed step of searching for free space excludes free space within the master file zone.

10. The method as recited in claim 1 wherein the processor performed third process flow further comprises the steps of:

locating and selecting one of the fragmented files and contiguous files stored in the master file table zone;

searching for contiguous free space, outside of the master file table zone of sufficient size to at least move either a portion of the selected fragmented file or the selected contiguous file; and repeating the locating and searching steps until substantially all fragmented files and substantially all contiguous files in the master file table zone have been selected.

11. A computer-usable medium having computer readable program code embodied therein for causing a computer to perform the steps of:

invoking a first process flow where contiguous and non-contiguous files are moved toward the beginning of the storage device so as to pack the files and file extents toward the beginning of the storage device and creating contiguous free space toward the end of the storage device;

invoking a second process flow to move files from the end of the storage device toward the beginning of the storage device, said second process flow tending to defragment file extents, said second process flow further comprising the steps of:

selecting each of the files stored on the storage device beginning with files located near the end of the storage device and proceeding toward files located toward the beginning of the storage device;

searching the storage device for free space of sufficient size between the file's current location and the beginning of the disk;

moving the selected file to the free space if the free space is sufficient to locate the entire file in a contiguous locations; and repeating the selecting, searching and moving steps until the front of the disk is reached;

repeating the first and second process flow so as to further minimize file fragmentation and pack contiguous files toward the beginning of the storage device;

invoking a third process flow to select fragmented files and move each fragment of said files toward the front of the storage device to create free space toward the end of the disk if no space is available toward the front of the storage device to at least partially defragment the file; and invoking the second process flow to move files toward the beginning of the storage device.

12. The computer-usable medium as recited in claim 11 wherein said computer-readable program code embodied therein causes a computer performing the first process flow to further perform the steps of:

selecting each of files stored on the storage device beginning with files located near the beginning of the storage device and proceeding toward files located toward the end of the storage device;

moving file extents and contiguous files to a location on the storage device that is closer to the beginning of the storage device than the current file location so as to pack the files toward the front of the storage device when sufficient contiguous free space exists between the current file location and the beginning of the storage device;

searching for contiguous free space between the end of the storage device and the beginning of the file;

moving file extents to the contiguous free space so as to make the file extents at least partially contiguous;

moving each of the contiguous files from its respective current location on the storage device to a location closer to the beginning of the storage device if sufficient free space is available; and searching for contiguous free space between the middle and the end of the storage device and moving file extents, whether contiguous or not, to the contiguous free space.

13. The computer-usable medium as recited in claim 11 wherein said computer-readable program code embodied therein causes a computer performing the third process flow to further perform the steps of:

selecting each of the files stored on the storage device beginning with files located at the beginning of the disk and proceeding toward the end of the storage device;

moving fragmented and contiguous files to a position on the storage device that is closer to the beginning of the disk than the current file location; and searching the storage device for free space of sufficient size between the file's current location and the end of the storage device to at least partially defragment the fragmented files by moving at least a portion of the file extents or the entire file to the free space.

14. In a computer system, a method for defragmenting a disk drive having a plurality of clusters of storage locations arranged in a sequential manner, said drive capable of storing a plurality of files where each of said plurality of files are stored in at least one cluster of the plurality of clusters of storage locations, said method comprising the steps of:

beginning at a first end of said disk drive and proceeding to about the middle of said disk drive, identifying files stored on said disk drive in either one or at least two contiguous clusters, said identifying step further comprising the steps of:

identifying files stored on said disk drive in at least two non-contiguous clusters; and moving said files stored in said at least two non-contiguous clusters to at least two contiguous clusters proximate to said second end of said disk drive;

determining whether each of said identified file abuts at least one cluster of free space;

moving said identified file to free space proximate to a second end of said disk drive if said the beginning storage location of the identified file abuts at least one cluster of free space;

repeating said identifying, determining and moving steps; and moving files proximate said second end of said disk toward the beginning of disk drive so as to eliminate clusters of free space between adjacent files stored on said disk drive.

15. The method of claim 14 wherein the identifying step further comprises the steps of:

identifying files stored on said disk drive in at least three non-contiguous clusters; and moving a portion of the file stored on said disk to free space that is no smaller than the square root of the total number of clusters comprising said identified file.

* * * * *